United States Patent
Song

[11] Patent Number: 6,128,493
[45] Date of Patent: Oct. 3, 2000

[54] HARD HANDOFF SYSTEM FOR A MOBILE PHONE AND METHOD THEREFOR

[75] Inventor: Wan-Jun Song, Seoul, Rep. of Korea

[73] Assignee: SamSung Electronics Co., Ltd., Suwon, Rep. of Korea

[21] Appl. No.: 08/909,478

[22] Filed: Aug. 11, 1997

[30] Foreign Application Priority Data

Aug. 9, 1996 [KR] Rep. of Korea ............... 96-33233

[51] Int. Cl.$^7$ .................................................. H04Q 7/22
[52] U.S. Cl. .................... 455/436; 455/442; 370/335; 370/332
[58] Field of Search ........................ 455/436, 438, 455/439, 442–443, 403; 370/320, 331, 335, 342

[56] References Cited

U.S. PATENT DOCUMENTS

| | | |
|---|---|---|
| 5,101,501 | 3/1992 | Gilhousen et al. . |
| 5,109,390 | 4/1992 | Gilhousen et al. . |
| 5,278,892 | 1/1994 | Bolliger et al. .......................... 455/442 |
| 5,327,577 | 7/1994 | Uddenfeldt ............................... 455/442 |
| 5,594,718 | 1/1997 | Weaver Jr. et al. . |
| 5,649,000 | 7/1997 | Lee et al. . |
| 5,682,380 | 10/1997 | Park et al. ........................... 455/436 X |
| 5,848,063 | 12/1998 | Weaver, Jr. et al. ..................... 370/331 |

*Primary Examiner*—William G. Trost
*Attorney, Agent, or Firm*—Robert E. Bushnell, Esq.

[57] ABSTRACT

Disclosed is a hard handoff system for a mobile phone in a CDMA radio communication system having at least two adjacent first and second cellular service areas, which comprises a first base station for serving the mobile phone in the first cellular service area through one of preset multiple traffic channels, a second base station for serving the mobile phone in the second cellular service area through one of preset multiple traffic channels, and a control station for allocating another one of the multiple traffic channels to the first and second base stations to serve the mobile phone moving from the first to the second cellular service area if the traffic channel serving the first base station is not available for the second base station.

14 Claims, 5 Drawing Sheets

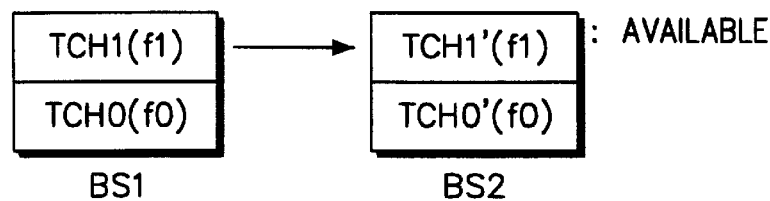
FIG. 2A
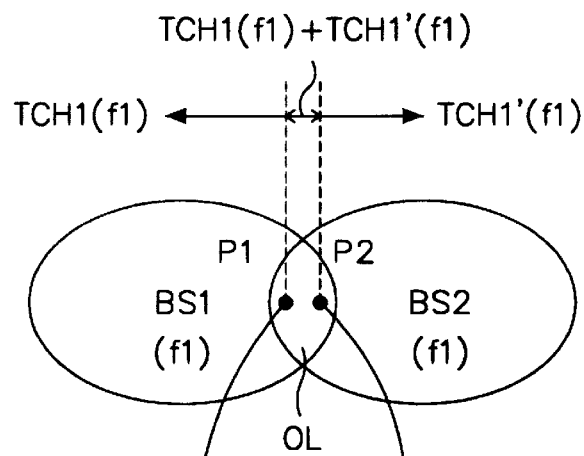
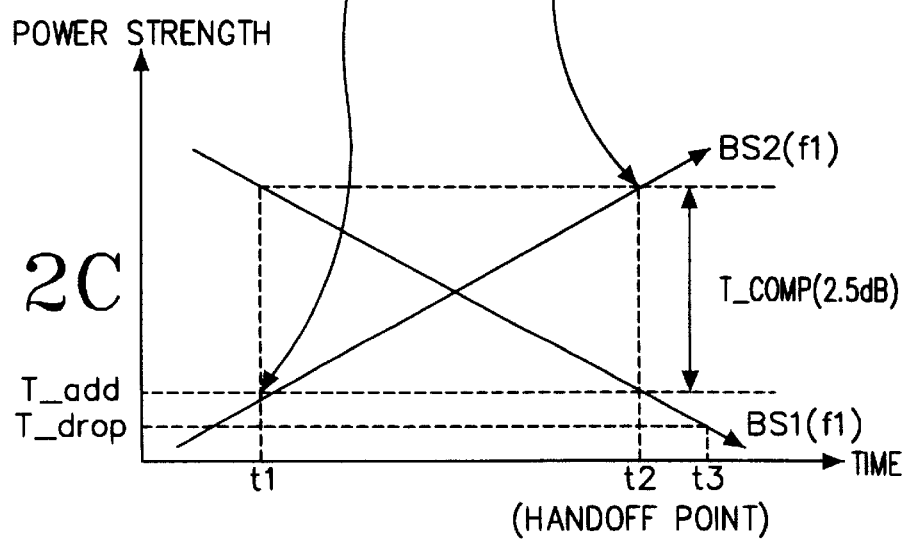
FIG. 2B
FIG. 2C

HARD HANDOFF SYSTEM FOR A MOBILE PHONE AND METHOD THEREFOR

CLAIM OF PRIORITY

This application makes reference to, incorporates the same herein, and claims all benefits accruing under 35 U.S.C §119 from an application entitled Hard Handoff System For A Mobile Phone And Method Therefore earlier filed in the Korean Industrial Property Office on Aug. 9, 1997, and there duly assigned Ser. No. 96-33233 by that Office.

BACKGROUND OF THE INVENTION

1. Field of the Invention

The present invention concerns a code division multiple access (CDMA) communication system, and more particularly a hard handoff system for handing off the service of a mobile phone from one base station to another base station and method therefor.

2. Description of the Related Art

Generally, in a CDMA communication system, when a mobile phone is moving from the service area served by one base station to the adjacent service area served by another base station, there is required a hard or soft handoff operation to continuously serve the mobile phone without interruption of the communication. The soft handoff is achieved without changing frequency channel, frame offset, or pseudo noise (PN) offset, etc. while the hard handoff requires changing of at least one of them.

Typically, when a mobile phone is moving from a first cellular service area served by corresponding base station to the second cellular service area served by a different base station, the handoff operation is started by a control station in the overlapped zone common to the first and second cellular service areas. The control station carries out a soft handoff or a hard handoff according to predetermined situations. Namely, the control station carries out the soft handoff if the traffic channel employed by one base station is available for another base station, or else the hard handoff is carried out. A soft handoff technique for use in a CDMA cellular telephone system is described in U.S. Pat. No. 5,101,501 to Klein S. Gilhousen, et al., entitled Method And System For Providing A Soft Handoff In Communications In A CDMA Cellular Telephone System. U.S Pat. No. 5,594,718 to Lindsay A. Weaver, Jr., et al. entitled Method And Apparatus For Providing Mobile unit Assisted Hard Handoff From A CDMA Communication System describes both a soft handoff technique and a hard handoff technique for use where neighboring cell sites may utilize either a CDMA system or an FM system. U.S. Pat. No. 5,649,000 to Dong-Wook Lee, et al., entitled Method And System For Providing A different Frequency Handoff In A CDMA Cellular Telephone System proposes a system for use in an area where a soft handoff is not possible, e.g., a CDMA system which includes a FDMA (frequency division multiple access) scheme, and thus utilizes a hard handoff technique.

The soft handoff uses a diversity combining technique employing a rake receiver, and the adjacent base station is added to the presently serving base station whose transmission power strength is large enough to be effective, so that there occurs hardly a problem in the communication between the mobile phone and the control station during handoff. Further, the soft handoff is carried out between two channels of the same frequency, thus securing reliability of the handoff. An example of a diversity receiver is provided in U.S. Pat. No. 5,109,390 to Klein S. Gilhousen, et al., entitled Diversity Receiver In A CDMA Cellular Telephone System.

Compared to the soft handoff, the hard handoff suffers from an inherent drawback because the handoff is over a different frequency on an adjacent traffic channel. In this case, the diversity is removed as soon as the service channel of the mobile phone is changed to the different traffic channel having the different frequency, and therefore the receiving quality is degraded compared to the previous communication environment. In addition, the power strength received by the mobile phone differs before and after changing the frequency channel even at the same position. Therefore, the power strength of the presently serving base station becomes weak making it undesirable for use in the communication between the mobile phone and the control station.

SUMMARY OF THE INVENTION

It is an object of the present invention to provide a hard handoff system which may keep substantially the same diversity after changing the frequency channel, and method therefor.

Another object of the present invention is to provide a hard handoff system which is not affected by the service ranges of the base stations varied according to the frequency channels, and method therefor.

According to the present invention, a hard handoff system for a mobile phone in a CDMA radio communication system having at least two adjacent first and second cellular service areas comprises a first base station for serving the mobile phone in the first cellular service area through one of preset multiple traffic channels, a second base station for serving the mobile phone in the second cellular service area through one of preset multiple traffic channels, and a control station for allocating another one of the multiple traffic channels to the first and second base stations to serve the mobile phone moving from the first to the second cellular service area if the traffic channel serving the first base station is not available for the second base station.

According to another aspect of the present invention, a hard handoff method for a mobile phone in the CDMA radio communication system comprises the steps of continuously informing the control station of the power strengths of the first and second base stations when the power strength of the second base station through the traffic channel serving the first base station reaches a preset value, determining whether the traffic channel serving the first base station is available for the second base station or no when the power strength of the second base station exceeds that of the first base station over another preset value, allocating another one of the multiple traffic channels to the first and second base stations to serve the mobile phone moving from the first to the second cellular service area if the traffic channel is not available for the second base station, and handing off the service of the mobile phone from the first to the second base station when the power strength of the second base station through the newly allocated traffic channel reaches further another preset value.

According to yet another aspect of the present invention, a hard handoff method for a mobile phone in the CDMA radio communication system comprises the steps of continuously informing the control station of the power strengths of the first and second base stations when the power strength of the second base station through the traffic channel serving the first base station reaches a preset value, determining whether the traffic channel serving the first base station is available for the second base station or no when the power strength of the second base station exceeds that of the first base station over another preset value, allocating another one of the multiple traffic channels to the first and second base stations to serve the mobile phone moving from the first to the second cellular service area if the traffic channel is not available for the second base station, and handing off the service of the mobile phone from the first to the second base station when the power strength of the second base station through the newly allocated traffic channel exceeds that of the first base station over still another preset value.

The present invention will now be described more specifically with reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A, 2B and 2C illustrate a conventional soft handoff operation;

DETAILED DESCRIPTION OF THE PREFERRED EMBODIMENT

Figure 1:
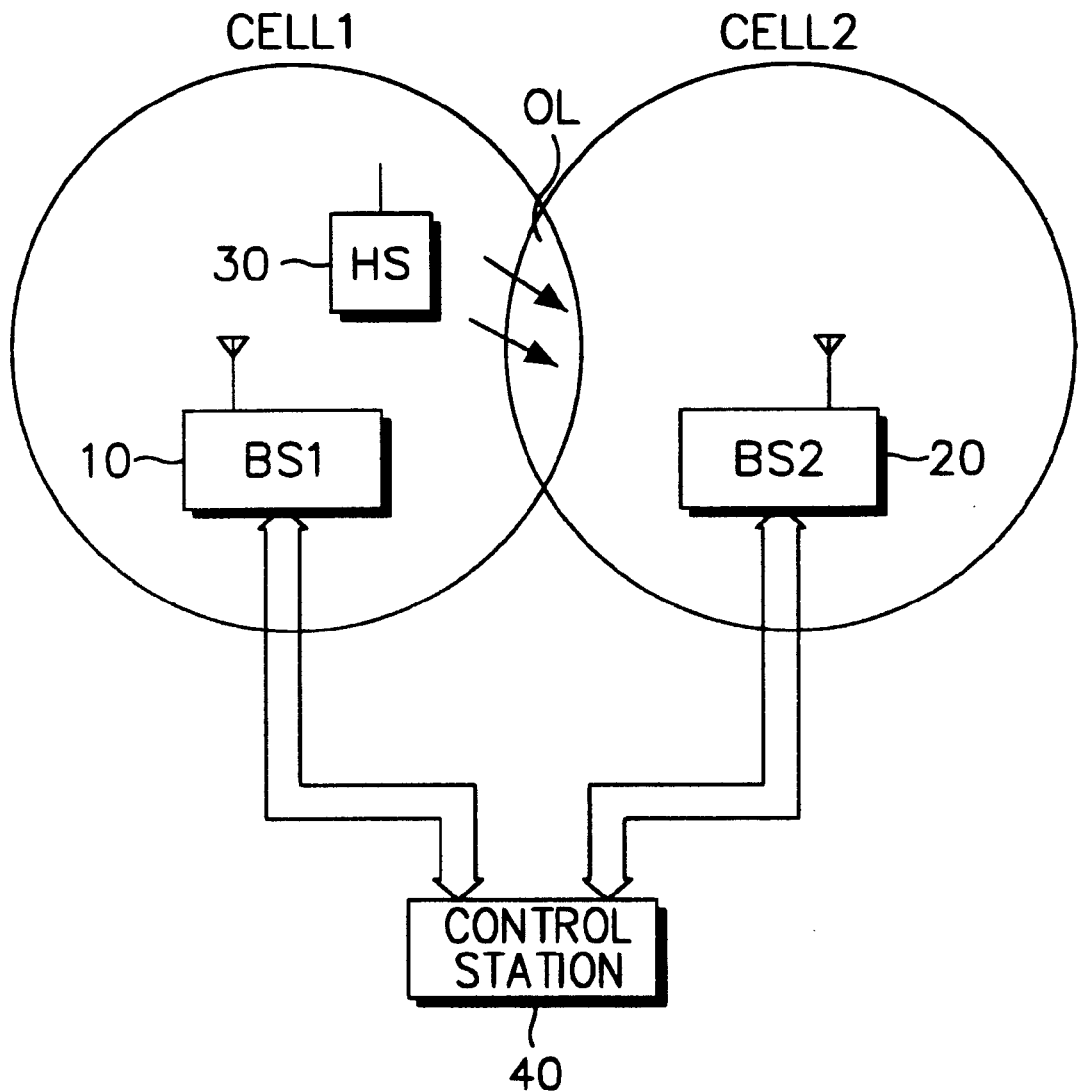
FIG. 1 is a diagram for illustrating a mobile phone moving from one cellular service area to an adjacent cellular service area in a CDMA communication system.

Referring to FIG. 1, when a handset (mobile phone) 30 is moving from the first cellular service area CELL1 served by a first base station (BS1) 10 to the second cellular service area CELL2, a handoff operation is started by a control station 40 while mobile phone 30 is in the overlapped zone OL commonly occupied by the first and second service areas CELL1 and CELL2. Control station 40 carries out a soft handoff as shown in FIG. 2 or hard handoff as shown in FIG. 3 according to the situation. Namely, control station 40 carries out a soft handoff if the traffic channel employed by first base station 10 is available to the second base station (BS2) 20. If the traffic channel is not available to second base station 20, control station 40 carries out a hard handoff.

Describing the soft handoff, with reference to FIGS. 2A–2C, when mobile phone 30, served through a traffic channel TCH1 of a frequency f1, travels into overlapped zone OL and detects that the transmission power strength of second base station 20 reaches a preset value T_add at time t1 at position P1 of the overlapped zone OL as shown in FIGS. 2B and 2C, it informs control station 40 of the transmission power strength of second base station 20. Then, control station 40 determines whether the traffic channel THC1' of the frequency f1 of second base station 20 is available or not. If traffic channel TCH1' is available, control station 40 controls mobile phone 30 to be continuously served through both the traffic channel TCH1 of first base station 10 and the traffic channel TCH1' of second base station 20.

As the mobile phone 30 moves continuously towards second base station 20, the transmission power strength of the first base station 10 is reduced below the preset value T_add at time t2 at position P2 of the overlapped zone OL as shown in FIGS. 2B and 2C, and then control station 40 assigns only second base station 20 to serve mobile phone 30 by dropping first base station 10. Namely, control station 40 hands off mobile phone 30 from service area CELL1 to service area CELL2 without changing the channel of the frequency f1. Such a soft handoff uses the diversity combining technique such that, for example, the signal-to-noise ratio of both the first and second base stations are combined to increase the quality and reliability of the communication.

Compared to a soft handoff, the hard handoff suffers some inherent drawback. Referring to FIGS. 3A–3D, when mobile phone 30, served through a traffic channel TCH1 of a frequency f1, moves into the overlapped zone OL and detects that the transmission power strength of second base station 20 reaches a preset value, it informs control station 40 of the transmission power strength of second base station 20. Then, control station 40 determines whether traffic channel THC1' of the frequency f1 of second base station 20 is available or not. If traffic channel TCH1' is not available, control station 40 hands off the service of mobile phone 30 to traffic channel TCH0' of frequency f0 of second base station 20 when the power strength of second base station 20 exceeds the power strength of first base station 10 over a preset value of, for example, 2.5 dB.

Figure 3A:
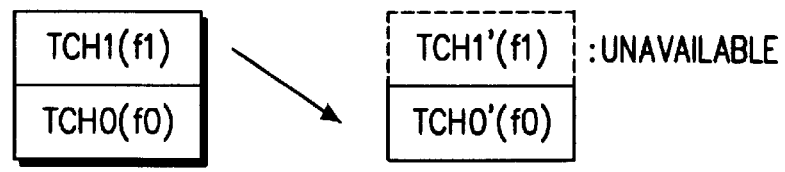
FIGS. 3A, 3B, 3C and 3D illustrate a conventional hard handoff operation.
Figure 3B:
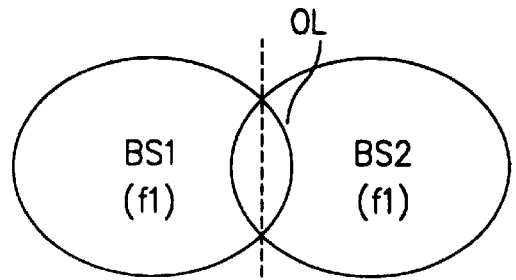
Figure 3C:
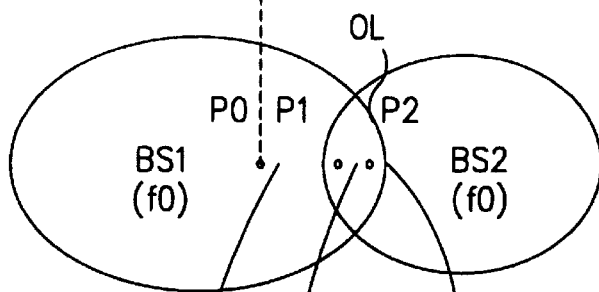
Figure 3D:
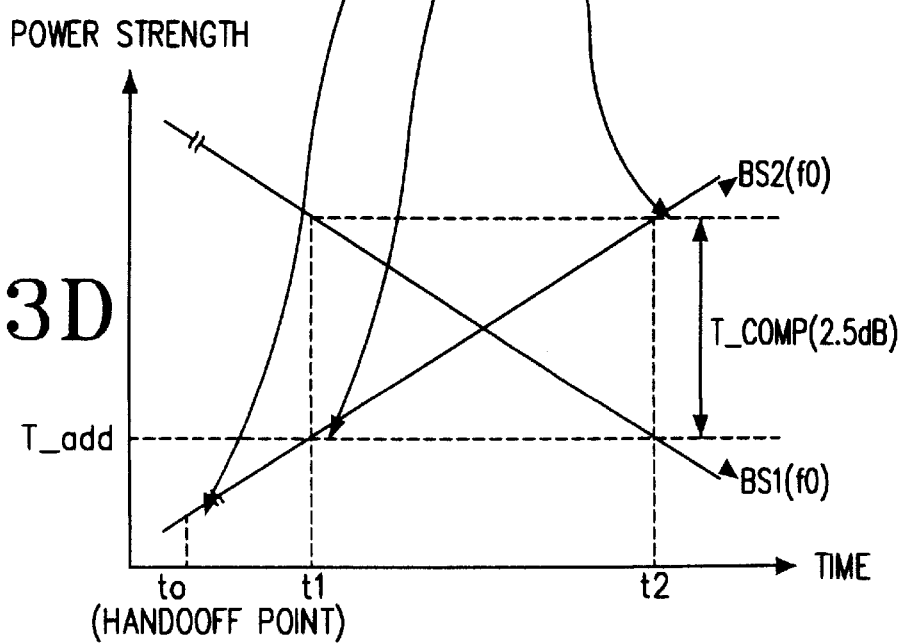

In this case, the diversity is removed as soon as the service channel of mobile phone 30 is changed to traffic channel TCH0' of frequency f0, and therefore the receiving quality is degraded compared to the previous communication environment of FIG. 2A. In addition, because the cell planning is carried out per frequency channel, the service ranges of the base stations are varied according to the frequency channels, as shown in FIGS. 3B and 3C. Thus, the power strength received by the mobile phone differs before and after changing the frequency channel even at the same position. For example, although the power strength of the channel of the frequency f1 is large enough to effectively serve the mobile phone, it becomes considerably degraded when changing the channel to the frequency f0. Moreover, the time of changing the frequency channel should be when the power strength of the adjacent base station exceeds that of the presently serving base station over a certain value. Therefore, the power strength of the presently serving base station becomes weak making it undesirable to the communication between the mobile phone and the control station.

Referring now to FIGS. 4A–4D and 5, the inventive hard handoff operation of a mobile phone 30 from one base station 10 to the adjacent base station 20 is characterized by including the steps of changing the present traffic channel TCH1 of base station 10 with another traffic channel TCH0 and handing off the service of the mobile phone to traffic channel TCH0' of adjacent base station 20. This is different from the hard handoff operation described above which contemplated a hard handoff of the service of mobile phone from traffic channel TCH1 of first base station 10 directly to traffic channel TCH0' of second base station 20.

First, it is supposed that mobile phone 30 is moving from cellular service area CELL1 of first base station 10 to second cellular service area CELL2 of second base station 20. In steps S1A–S1C of FIG. 5, mobile phone 30 continuously informs control station 40 of the pilot strength measurement message (PSMM) representing the power strengths of the presently serving base station 10 and the adjacent base station 20 from the time when the power strength of second base station 20 detected through the channel TCH1' has a preset value T_add. Then, control station 40 makes a handoff determination in step S2 when the power strength of base station 20 exceeds the power strength of base station 10 by a preset value of, for example, 2.5 dB. Namely, control station 40 determines that a soft handoff is to be performed when traffic channel TCH1' of second base station 20 employing the same frequency f1 as the presently serving traffic channel TCH1 of the first base station 10 is available. When traffic channel TCH1' of second base station 20 employing the same frequency f1 as the presently serving traffic channel TCH1 of the first base station 10 is not available, control station 40 determines that a hard handoff is to be performed.

Figure 4A:
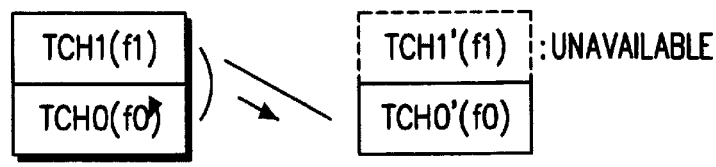
FIGS. 4A, 4B, 4C and 4D illustrate a hard handoff operation according to the principles of the present invention.
Figure 4B:
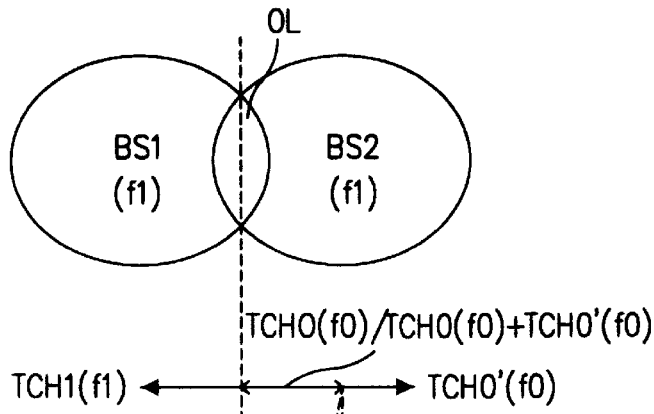
Figure 4C:
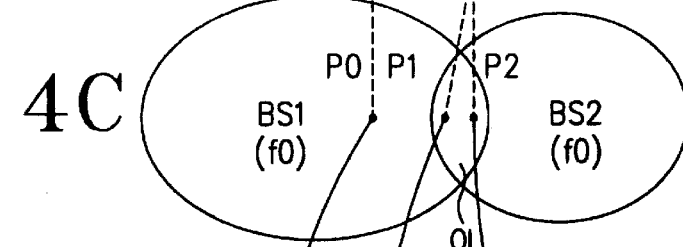
Figure 4D:
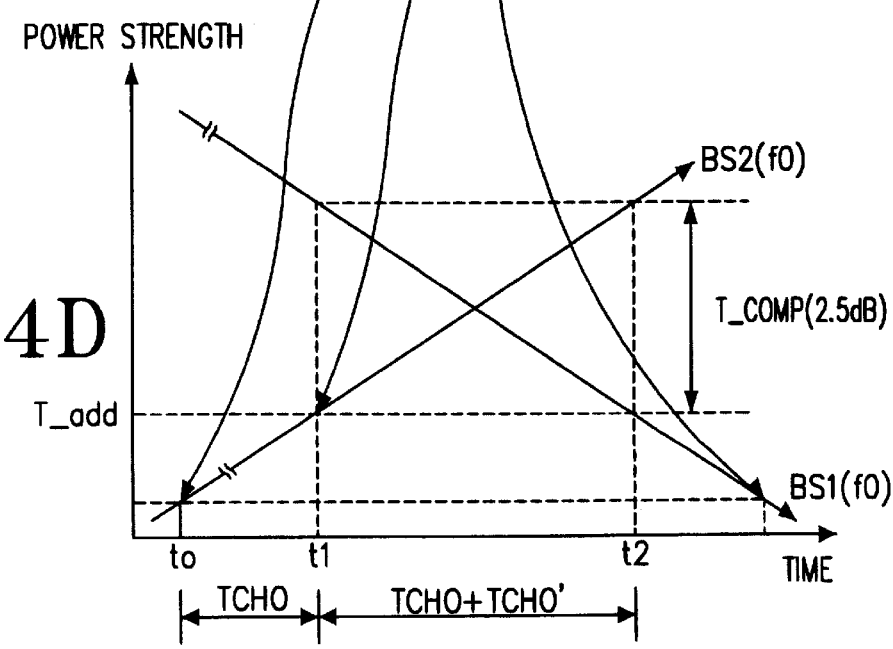
Figure 5:
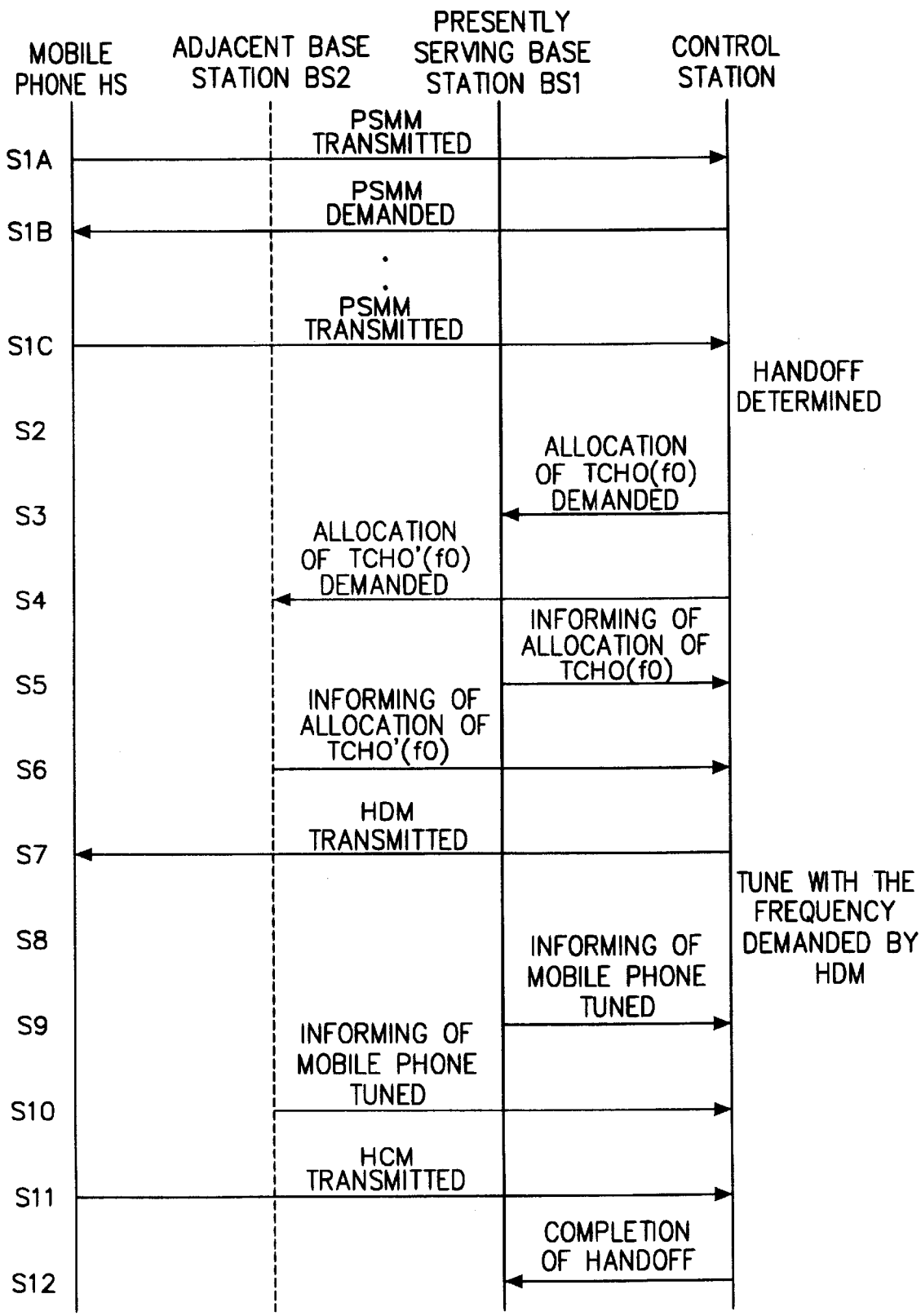
FIG. 5 is a diagram for illustrating the operational sequence between the base stations and mobile phone and control station for handoff according to the principles of the present invention.

Upon determining the hard handoff, control station 40 demands first base station 10 and the adjacent second base station 20 to respectively allocate new traffic channels TCH0 and TCH0' commonly employing the same frequency f0, in steps S3 and S4. Then, base stations 10 and 20 inform control station 40 of the result, in steps S5 and S6, after newly allocating traffic channels TCH0 and TCH0', respectively. Being informed of the new allocation of the frequency channel, control station 40 transmits in step S7, a handoff direction message (HDM) to mobile phone 30 to tune to base stations 10 and 20 at the allocated frequency f0. Subsequently, mobile phone 30 receives the services from both the first and second base stations 10 and 20 through their respective channels TCH0 and TCH0', as shown in FIG. 4C. Base stations 10 and 20 then inform control station 40 of their connections with mobile phone 30 through respective channels TCH0 and TCH0', in steps S9 and S10.

Thereafter, detecting, through the channel TCH0', when the power strength of second base station 20 reaches preset value T_add, mobile phone 30 informs the control station 40 of the respective power strengths of the base stations 10 and 20. Further, as the power strength of second base station 20 reaches a given value preset by control station 40, mobile phone 30 transfers a handoff completion message (HCM) to control station 40 in step S11. In the present embodiment, the control station 40 makes a determination to hand off the service of mobile phone 30 from first base station 10 to second base station 20 when the power strength of second base station 20 exceeds the power strength of first base station 10 by another preset value T_COMP (2.5 dB). Alternatively, control station 40 may determine to hand off the service of mobile phone 30 from first base station 10 to second base station 20 when the power strength of second base station 20 exceeds the preset value T_add. Finally, upon receiving the HCM from mobile phone 30, control station 40 releases channel TCH0 of first base station 10 in step S12, so that the mobile phone 30 is served only by second base station 20. Namely, the service of the mobile phone 30 is completely handed off from first base station 10 to second base station 20.

Thus, the inventive hard handoff system provides means to make the presently serving station continue to service a mobile phone while the mobile phone is being handed off to the adjacent station so that diversity is maintained after changing the frequency channel. In addition, no problem occurs if the service range is altered after changing the frequency channel. Thus, cell planning is made easy because the optimization between the frequency channels hardly has to be considered. Consequently, the reliability of the hard handoff is improved to the level of the soft handoff.

Although the present invention has been described with reference to specific embodiments together with accompanying drawings, it will be readily appreciated by those skilled in this art that various modifications may be made without departing the gist of the present invention.

What is claimed is:

1. A handoff system for a mobile phone in a code division multiple access (CDMA) radio communication system having at least two adjacent cellular service areas, comprising:

a first base station for serving said mobile phone in a first cellular service area over a traffic channel having a first frequency;

a second base station for serving said mobile phone in a second cellular service area; and a control station for respectively controlling said first base station and said second base station to allocate a traffic channel having a second frequency for servicing said mobile phone over said traffic channel having said second frequency, when said mobile phone moves from said first cellular service area to said second cellular service area through an overlapping service area, by determining that a traffic channel having said first frequency is not available in said second base station.

2. The handoff system as set forth in claim 1, wherein said control station services said mobile phone through both said traffic channel having said second frequency allocated by said first base station and said traffic channel having said second frequency allocated by said second base station until a power strength of said second base station detected through said traffic channel having said second frequency allocated by said second base station reaches a preset value.

3. The handoff system as set forth in claim 2, wherein said control station cuts off said first base station from servicing said mobile phone an services said mobile phone through said second base station only, when said power strength of said second base station detected through said traffic channel having said second frequency allocated by said second base station reaches said preset value.

4. The handoff system as set forth in claim 1, wherein said control station cuts off said first base station from servicing said mobile phone an services said mobile phone through said second base station only, when a power strength of said second base station detected through said traffic channel having said second frequency allocated by said second base station reaches a preset value.

5. The handoff system as set forth in claim 1, wherein said control station services said mobile phone only through said second base station when a power strength of said second base station detected through said traffic channel having said second frequency allocated by said second base station exceeds a power strength of said first base station by a preset value.

6. A handoff system for a mobile phone in a code division multiple access (CDMA) radio communication system having at least two adjacent cellular service areas, comprising:

a first base station for serving said mobile phone in a first cellular service area over a traffic channel having a first frequency;

a second base station for serving said mobile phone in a second cellular service area; and a control station for respectively controlling said first base station and said second base station to allocate a traffic channel having a second frequency for servicing said mobile phone over said traffic channel having said second frequency, when a power strength of said second base station exceeds a power strength of said first base station by a predetermined value as said mobile phone moves from said first cellular service area to said second cellular service area through an overlapping service area, by determining that a traffic channel having said first frequency is not available in said second base station.

7. The handoff system as set forth in claim 6, wherein said control station services said mobile phone through both said traffic channel having said second frequency allocated by said first base station and said traffic channel having said second frequency allocated by said second base station until a power strength of said second base station detected through said traffic channel having said second frequency allocated by said second base station reaches a preset value.

8. The handoff system as set forth in claim 7, wherein said control station cuts off said first base station from servicing said mobile phone an services said mobile phone through said second base station only, when said power strength of said second base station detected through said traffic channel having said second frequency allocated by said second base station reaches said preset value.

9. The handoff system as set forth in claim 6, wherein said control station cuts off said first base station from servicing said mobile phone an services said mobile phone through said second base station only, when a power strength of said second base station detected through said traffic channel having said second frequency allocated by said second base station reaches a preset value.

10. The handoff system as set forth in claim 6, wherein said control station services said mobile phone only through said second base station when a power strength of said second base station detected through said traffic channel having said second frequency allocated by said second base station exceeds a power strength of said first base station by a preset value.

11. A handoff method for a mobile phone in a CDMA radio communication system having at least a first base station for serving said mobile phone in a first cellular service area over a traffic channel having a first frequency, a second base station for serving said mobile phone in a second cellular service area and a control station for controlling said second base station to service said mobile phone over a traffic channel having said first frequency or for respectively controlling said first base station and said second base station to service said mobile phone over a traffic channel having a second frequency, when said mobile phone moves from said first cellular service area to said second cellular service area, said method comprising the steps of:

detecting when a power strength of said second base station reaches a preset power strength value;

detecting when said power strength of said second base station exceeds a power strength of said first base station by a predetermined value;

determining whether said second base station has a traffic channel having said first frequency available to serve said mobile phone when said power strength of said second base station exceeds said power strength of said first base station by a predetermined value;

controlling, when it is determined that said second base station does have a traffic channel having said first frequency available to serve said mobile phone, said second base station to service said mobile phone over said traffic channel having said first frequency; and respectively controlling said first base station and said second base station to allocate a traffic channel having a second frequency for servicing said mobile phone over said traffic channel having said second frequency when it is determined that said second base station does not have a traffic channel having said first frequency available to serve said mobile phone.

12. The method as set forth in claim 11, wherein said step of respectively controlling said first base station and said second base station to allocate a traffic channel having a second frequency comprises a step of controlling said mobile phone to tune to said second frequency.

13. The method as set forth in claim 12, further comprising the steps of:

informing, by said first and second base stations, said control station of their connection to said mobile phone;

determining when said power strength of said second base station reaches a second preset power strength value; and disconnecting said first traffic channel of said first base station from said mobile phone when said power strength of said second base station reaches said second preset power strength value.

14. The method as set forth in claim 12, further comprising the steps of:

informing, by said first and second base stations, said control station of their connection to said mobile phone;

determining when said power strength of said second base station exceeds said power strength of said first base station by a second predetermined value; and disconnecting said first traffic channel of said first base station from said mobile phone when said power strength of said second base station exceeds said power strength of said first base station by said second predetermined value.

* * * * *